United States Patent
Gründl et al.

(10) Patent No.: US 8,366,208 B2
(45) Date of Patent: Feb. 5, 2013

(54) BRAKING ASSEMBLY FOR A LAND VEHICLE

(75) Inventors: Andreas Gründl, Starnberg (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 1458 days.

(21) Appl. No.: 11/836,930

(22) Filed: Aug. 10, 2007

(65) Prior Publication Data

US 2008/0048493 A1 Feb. 28, 2008

(30) Foreign Application Priority Data

Aug. 10, 2006 (DE) .......................... 10 2006 037 496

(51) Int. Cl.
*B60T 8/36* (2006.01)
*B60T 8/34* (2006.01)

(52) U.S. Cl. ............... 303/119.3; 303/119.1; 303/116.4; 303/DIG. 10

(58) Field of Classification Search ........... 303/DIG. 10, 303/87, 113.1, 119.1, 119.2, 119.3, 116.4
See application file for complete search history.

(56) References Cited

U.S. PATENT DOCUMENTS

| | | | |
|---|---|---|---|
| 2,871,878 A | 2/1959 | Shannon et al. | |
| 3,631,881 A | 1/1972 | Bowditch | |
| 4,453,567 A * | 6/1984 | MacDonald | 137/614.11 |
| 4,458,841 A | 7/1984 | Laakaniemi et al. | |
| 5,606,201 A | 2/1997 | Lutz | |
| 6,969,128 B2 * | 11/2005 | Sekihara | 303/113.1 |
| 2002/0032093 A1 | 3/2002 | Kopec et al. | |
| 2003/0042789 A1* | 3/2003 | Han | 303/119.3 |
| 2006/0017321 A1* | 1/2006 | Tsunooka | 303/119.3 |

FOREIGN PATENT DOCUMENTS

| | | |
|---|---|---|
| DE | 2648915 A1 | 10/1976 |
| DE | 8118656 U1 | 10/1981 |
| DE | 3810581 A1 | 10/1989 |
| DE | 282 513 A5 | 9/1990 |
| DE | 60204806 T2 | 2/2002 |
| EP | 0 309 986 A1 | 4/1989 |
| EP | 0720551 B1 | 9/1994 |
| WO | WO 97/29310 | 8/1997 |

* cited by examiner

*Primary Examiner* — Melody Burch
(74) *Attorney, Agent, or Firm* — Hiscock & Barclay, LLP (57) ABSTRACT

A brake unit for a hydraulic, single-circuit or multi-circuit braking system of a land vehicle, with fluid on-off valves to be operated electrically, an electronic closed-loop/open-loop control circuit to provide control signals for the fluid on-off valves by which the hydraulic pressure in the brake circuits is modulated, a unit body, which consists of at least two ceramic boards connected to each other, and which has the fluid on-off valves, hydraulic connecting lines between the fluid on-off valves being incorporated in the boards, and at least one of the boards being used as the carrier board for electrical/electronic components and electrical connecting lines of the electronic open-loop/closed-loop control circuit.

27 Claims, 5 Drawing Sheets

BRAKING ASSEMBLY FOR A LAND VEHICLE

FIELD OF THE INVENTION

The invention concerns a brake unit for a land vehicle. More precisely, a brake unit in a hydraulic, single-circuit or multi-circuit braking system, with solenoid valves to be operated electrically, an electronic closed-loop/open-loop control circuit to provide control signals for the solenoid valves by which the hydraulic pressure in the brake circuits is modulated. The invention also concerns such a hydraulic braking system.

BACKGROUND OF THE INVENTION

European patent no. 0 720 551 B1 BOSCH shows a typical model of such a traditional unit for slip-regulated braking systems of motor vehicles. This unit has a valve block of light metal with multiple stepped receiving holes for the hydraulic part of electromagnetically operated valves. In one step of the receiving hole, in each case this hydraulic part is inserted and fixed on the valve block by calking. A pressure-tight valve dome, which contains the magnetically active elements such as the armature and magnet core of the hydraulic part, projects above the valve block. A separately manufactured electrical part of the valve, which is plugged onto the valve dome, has an electrical coil which surrounds the valve dome, and a housing, which conducts magnetic flux, and in which, on the side facing the valve block, a soft magnetic ring disc to conduct the magnetic flux is received.

The hydraulic/electronic ABS/ASR/ESC closed-loop control unit TEVES MK60 (ASR (drive slip regulation) or FDR (Fahrdynamikregelung)=driving dynamics closed-loop control, e.g. ESC=electronic stability control), which has a central hydraulic block of aluminium with electromagnetically switching valves and an integrated hydraulic fluid pump, represents a comparable arrangement. This pump is operated by an electric motor which is attached to one side of the hydraulic block. On the opposite side of the hydraulic block, there is a separate coil holder for the electromagnetically switching valves, including the associated, likewise separately manufactured open-loop/closed-loop control electronics. The coil holder is put onto the valves by means of a so-called "magnetic plug". The valves are practically divided into two: a hydraulic/mechanical part which is incorporated in the central hydraulic block, and a valve coil which is contained in/on the housing of the associated open-loop/closed-loop control electronics. When the open-loop/closed-loop control electronics are plugged onto the hydraulic/mechanical part of the valves in/on the central hydraulic block, the valves become functional. The electromagnetically switching valves make it possible to modulate the brake pressures. An outlet valve and an inlet valve, with non-return valve connected in parallel, are associated with each brake circuit. The central hydraulic block has two fluid connections for connection to a main brake cylinder which is operated by the brake pedal, and four brake line connections which each lead to a wheel brake. The pump which is integrated into the hydraulic block is a dual-circuit reciprocating pump, which conveys brake fluid from a low-pressure reservoir into the appropriate brake circuits. It thus replaces the brake fluid which is withdrawn from the brake circuits during ABS regulation. During active closed-loop control processes (e.g. ASR or ESC), which run without the brake pedal being operated by a driver, the pump makes the fluid volume which is required in the pressure buildup phase available in the brake circuits.

From the wheel rotational speeds which are captured on the four wheels by means of appropriate sensors, and other information (e.g. vehicle yaw rate, steering wheel angle, hydraulic pressure in the braking system, brake light switches, etc.), the open-loop/closed-loop control electronics determine the control signals for the actuators (electromagnetically switching valves, hydraulic pump, engine management, etc.). The aim is to increase the driving stability of the vehicle during braking—even on bends—to maintain the maneuverability of the vehicle even in critical braking situations—e.g. different coefficients of friction of the road surface—and if possible to use the existing braking distance optimally, to prevent racing of the driving wheels of the vehicle, and to improve the transverse dynamic handling properties of the vehicle independently of pedal operation. Finally, the control noises, the pedal vibration ("pedal feel") and control convenience should also be optimised.

It is common to all known designs that the construction and assembly of such hydraulic/electronic ABS/ASR/ESC closed-loop control units is very complicated. Additionally, these closed-loop control units are very heavy and bulky despite the use of light metal for the hydraulic block, not least because of the large number of fluid on-off valves and the required high fluid pump power. There is also the constant pressure from the vehicle manufacturers on the costs of components and systems from their supplier partners.

WO 97/29310 A1, US 2002/0032093 A1 and DE 10344662 A1 show brake, transmission or steering units or their valve modules with ceramic components. These concern the carrier board for the electronics and/or valve elements.

DE 60204806 T2, U.S. Pat. No. 2,871,878 A, U.S. Pat. No. 3,631,881 A and

U.S. Pat. No. 4,458,841 A show valve modules which are in sandwich construction, and in which the unit bodies consist of boards which are connected to each other and have fluid on-off valves, hydraulic connecting lines between the fluid on-off valves being incorporated in the boards. The boards consist of metal or plastic.

U.S. Pat. No. 5,606,201 A, EP 0 309 986 A1 and DD 282 513 A5 show ceramic components which have a fluid line and are also in the form of electronic carriers. From DD 2825513 A5, ceramic boards which are connected to each other and have incorporated hydraulic connecting lines can be taken.

DE 81 18 656 U1 and DE 26 48 915 A1 show ceramic valve housings.

Problem on which the Invention is Based

The invention is therefore based on the problem of providing, in a hydraulic braking system, a brake unit which with comparable or improved functionality is more compact than the traditional units, weighs less and is less expensive to manufacture.

Solution According to the Invention

As the solution to this problem, the invention teaches a brake unit for a hydraulic, single-circuit or multi-circuit braking system, with solenoid valves to be operated electrically, an electronic closed-loop/open-loop control circuit to provide control signals for the solenoid valves by which the hydraulic pressure in the brake circuits is modulated. This brake unit has a unit body, which consists of at least two ceramic boards connected to each other, and which has the fluid on-off valves. In the boards or their surfaces, hydraulic connecting lines between the solenoid valves are incorporated. Additionally, at least one of the boards is used as the carrier board for electrical/electronic components and electrical connecting lines of the electronic open-loop/closed-loop control circuit.

Advantages and Further Developments of the Invention

Until now, the unanimous view of the leading manufacturers of braking systems has been on the basis that in the case of a hydraulic/electronic ABS/ASR/ESC closed-loop control unit, the hydraulic block must be produced from solid light metal, to which the control and power electronics and the pump if any are added as separate modules; see "Bremsenhandbuch (brake manual)", Bert Breuer et al., ATZ-MTZ-Fachbuch Vieweg Verlag, 2nd edition, 2004, "Elektronische Bremssysteme (electronic braking systems)", Hans-Rolf Reichel, Expert Verlag, 1st edition, 2001, "Fahrwerktechnik: Radschlupf-Regelsysteme (chassis engineering: wheel slip closed-loop control systems)", Manfred Burckhardt, Vogel Fachbuchverlag, 1st edition, 1993,

DE 38 10 581 A1,

European patent no. 720 551 B1, and numerous other publications.

In contrast, the invention has recognised that by turning away from this view, which until now has been considered to be the only correct one, considerable advantages in various respects can be achieved:

Whereas traditionally the hydraulic unit and the electronic unit are manufactured separately by basically different production methods, and then, for instance, connected to each other via the "magnetic plugs" of the solenoid valve coils—this is also called "decomposed construction"=the invention offers, for the first time, the possibility of manufacturing an integrated hydraulic/electronic ABS/ASR/ESC closed-loop control unit in a uniform technology. All components, whether hydraulic, electronic, electrical or electromechanical, of the closed-loop control unit are integrated jointly into one brake unit. This technology uses the same operations and assembly machines with which the components of the electronic controller are produced to produce the hydraulic and electromechanical components of the brake unit. This saves considerable costs in production and logistics. In principle, tried and tested production methods and materials of electronic production are used to produce the hydraulic and electromechanical components of the closed-loop control unit.

The weight and volume of the closed-loop control unit according to the invention are considerably reduced compared with traditional closed-loop control units, because the (ceramic multi-layer) substrate for the electronics is used simultaneously as the carrier and receptacle for the hydraulic components. Additionally, the electronic, electrical and electromechanical components can be arranged more "densely" with the hydraulic components than in the case of the traditional construction. This makes shorter hydraulic and electrical line arrangements possible, and also results in less liability to interference by or for other, external modules in increasingly electrified vehicles. The probability of failure falls because of the uniform production technology, and interface problems between the electronics and the mechanics/hydraulics of the unit are considerably reduced.

According to the invention, the unit body can be formed of three or more ceramic boards which are connected to each other at their surfaces, and of which at least one can have, on one of its surfaces, a conductive metal layer, from which the electrical connecting lines of the electronic closed-loop/open-loop control circuit can be formed. Effectively, the boards of the unit body form a ceramic multilayer substrate, the boards of which are preferably connected to each other by soldering, in particular by brazing. In a specially preferred embodiment of the invention, the boards, which are connected to each other, of the unit body are formed of silicon nitride, sintered silicon nitride, hot-isostatically pressed silicon nitride or reaction-bound silicon nitride. At least one of the boards can be provided on one or both surfaces with a conductive metal layer containing copper, aluminium or similar.

The base ceramic substrate is silicon nitride ($Si_3N_4$). Silicon nitride has very good material properties for this invention: high toughness, high strength, even at high temperatures, good resistance to temperature change, high resistance to wear, low thermal expansion, medium thermal conductivity and good chemical resistance. Compared with other ceramic materials, e.g. aluminium oxide ($Al_2O_3$) and aluminium nitride (AlN), silicon nitride has considerably more bending strength and resistance to breaking. In the case of the copper-bound silicon nitride substrate, which can be used advantageously for the invention, the copper is firmly connected to the silicon nitride substrate, e.g. by means of a silver-copper-titanium brazing alloy. This brazing process connects the copper mechanically significantly better and thus more reliably to the ceramic than traditional methods of copper bonding without metallisation, in which methods a copper oxide method is usually used. The brazed, copper-bonded silicon nitride substrate is also mechanically much more stable than traditional copper-bound aluminium oxide and aluminium nitride substrates. Despite that, however, use of other ceramic materials, e.g. aluminium oxide ($Al_2O_3$) or aluminium nitride (AlN) instead of silicon nitride ($Si_3N_4$), is also within the scope of this invention.

According to the invention, the hydraulic connecting lines can be formed as recesses or cutouts of the boards and/or their metal layer if any.

Preferably, the fluid on-off valves are incorporated in the boards, which are connected to each other, of the unit body. Each fluid on-off valve has a valve seat, which is a preferably approximately conical opening, and a valve element, which is preferably a ceramic body, which must be pressed into the valve seat to seal it, and lifted away from it. Instead of a ceramic body, the valve element can also be in the form of a metal body. The conical opening of the valve seat can be incorporated in both the ceramic layer and one of the metal layers. It is also possible to incorporate the conical opening of the valve seat in two adjacent metal layers of two boards of the unit body which are connected to each other. By an appropriate current feed, the fluid on-off valves can not only be brought into open or closed positions, but also, e.g. by pulse width modulation or by voltage or current amplitude control, be brought into intermediate positions.

According to the invention, the valve element can be brought into its activated position by means of a multipole electromagnet arrangement, and into its idle position relative to the valve seat by means of a spring arrangement. Instead of the multipole electromagnet arrangement, a cup core electromagnet arrangement can be used, provided that the requirements for the switching processes (speed, retention forces, etc.) are not all too high.

The multipole electromagnet arrangement can have a stator and an armature. The stator can be in the form of a multipole stator with multiple stator poles, and have exciter coils which are assigned to the appropriate stator poles. Correspondingly, the armature can be in the form of a multipole armature, the armature poles of which can be aligned onto the appropriate stator poles.

Between the stator and the armature, the electromagnet arrangement can have a working air gap, which is preferably oriented transversely to the direction of motion of the armature.

To expose the valve element in operation to the smallest possible punctiform or linear loads by the armature of the electromagnet arrangement, according to the invention the valve element can be operated via a coupling spring element with the armature of the electromagnet arrangement. Also, the valve element can be brought into its idle position relative to the valve seat via a pretensioning spring element.

Preferably, the pretensioning spring element and/or the coupling spring element are in the form of leaf springs, which are supported at one or both ends.

Both the pretensioning spring element and the coupling spring element can be manufactured from a nickel-chromium alloy, the material properties of which allow the spring elements to survive the process of connecting the boards (by brazing) without damage. For instance, a nickel-chromium alloy Ni53/Cr20/Co18/Ti2.5/Al1.5/Fe1.5, with good corrosion and oxidation resistance and high tensile strength and creep strength at temperatures up to 815° C., can be used for the spring elements. According to the invention, the spring constant of the coupling spring element is dimensioned lower than the spring constant of the pretensioning spring element.

As well as the fluid on-off valves, the brake unit has at least one non-return valve, which is incorporated in the boards, which are connected to each other, of the unit body. The purpose of these non-return valves is to allow hydraulic fluid to flow through a hydraulic connecting line in one direction, and to block it in an opposite direction. Each non-return valve has a valve seat, which is a preferably approximately conical opening, and a valve element, which is preferably a ceramic body, which must be pressed into the valve seat by a pretensioning spring element to seal it, and lifted away from the valve seat by flowing hydraulic fluid which presses against the pretensioning spring element.

The brake unit according to the invention also has at least one hydraulic pump arrangement for controlled pressurising of the hydraulic fluid. This hydraulic pump arrangement has a pressure chamber with at least one fluid inlet and at least one fluid outlet. At the fluid inlet and fluid outlet, in each case at least one non-return valve of the type described above as an example is arranged. The hydraulic pump arrangement also has a piston which extends into the pressure chamber, and which can be moved by means of a multipole electromagnet arrangement at least into one of two end positions. In one end position, a minimum volume is bounded by the pressure chamber and the piston, and in the other end position, a maximum volume is bounded by the pressure chamber and the piston.

Instead of the multipole electromagnet arrangement, a cup armature electromagnet arrangement can be provided. Both types of electromagnet arrangement can be in a form which is active in the pulling direction, pushing direction or both directions. In other words, for instance the multipole electromagnet arrangement can be set up to move the piston, which extends into the pressure chamber, into both end positions. This allows higher dynamics in the pressure buildup in the hydraulic fluid and a higher fluid volume flow.

According to the invention, the brake unit can have a multipole electromagnet arrangement with a stator and an armature, in which arrangement the stator is in the form of at least one multipole stator with multiple stator poles, and has exciter coils which are assigned to the appropriate stator poles, and/or the armature is in the form of a multipole armature, the armature poles of which are aligned onto the appropriate stator poles.

Preferably, the stator has two multipole stators which are arranged at an axial distance from each other, and which between them receive a multipole armature, which in operation is attracted by both multipole stators alternately, to move the piston between its end positions in the pressure chamber.

The armature is optionally connected to the movable piston or part of it. Between the stator and the armature, the electromagnet arrangement of the pump arrangement has a working air gap, which is preferably oriented transversely to the direction of motion of the armature.

The pressure chamber, the piston and the electromagnet arrangement are in the form of a preassembled module which can be handled together, and which is to be inserted in a correspondingly shaped recess in the unit body. For this purpose, the housing of the hydraulic pump arrangement is preferably in two parts. A housing lower part receives a (lower) stator arrangement, and preferably has a guide surface for the piston and/or armature formed on it in one piece.

In the case of a brake unit according to the invention, two separate pump systems can be provided (e.g. each for two wheel brakes of an axle of the vehicle). Each pump system is in the form of a pressure chamber, a piston and an electromagnet arrangement, and non-return valves at the inlet and outlet. The two pump systems can be drivable in opposite phase. This reduces the development of noise in operation.

According to the invention, between the stator and the armature, the electromagnet arrangement of the pump systems too can have a working air gap, which is preferably oriented transversely to the direction of motion of the armature.

Instead of the hydraulic pump arrangement described above, with the electromagnet arrangement as the drive mechanism, according to the invention an eccentric drive mechanism which has an electric motor and is operated by the electronic controller can be provided. The eccentric drive mechanism has one or more cams which are to be made to revolve by the electric motor, and which act on the piston which extends into the pressure chamber. An electric motor or eccentric drive mechanism can act on the pistons of two or more separate hydraulic pump arrangements. Incidentally, the pump modules can be used by the hydraulic pump arrangement described above.

To connect the brake unit hydraulically to the main brake cylinder and the wheel brakes, on at least one side of the unit body a connecting block with hydraulic connections for the hydraulic connecting lines is provided. According to the invention, this connecting block can be arranged hydraulically floating on the unit body. This avoids problems because of different thermal coefficients of expansion. The connecting block can be manufactured from aluminium or another light metal.

On a side of the unit body opposite the connecting block, an electrical plug-and-socket connector can be arranged. In this way the power supply for the open-loop and closed-loop electronics and additional sensor signals can be provided to the brake unit.

In the hydraulic connecting lines, cutouts which extend through at least one board of the connecting block, and in which filters are inserted, can be provided. These filters can be porous sinter blocks which are fixed in the cutouts (vias).

Other features, properties, advantages and possible modifications become clear for a person skilled in the art on the basis of the following description, which refers to the attached drawings.

DETAILED DESCRIPTION OF CURRENTLY PREFERRED EMBODIMENTS

Figure 1:
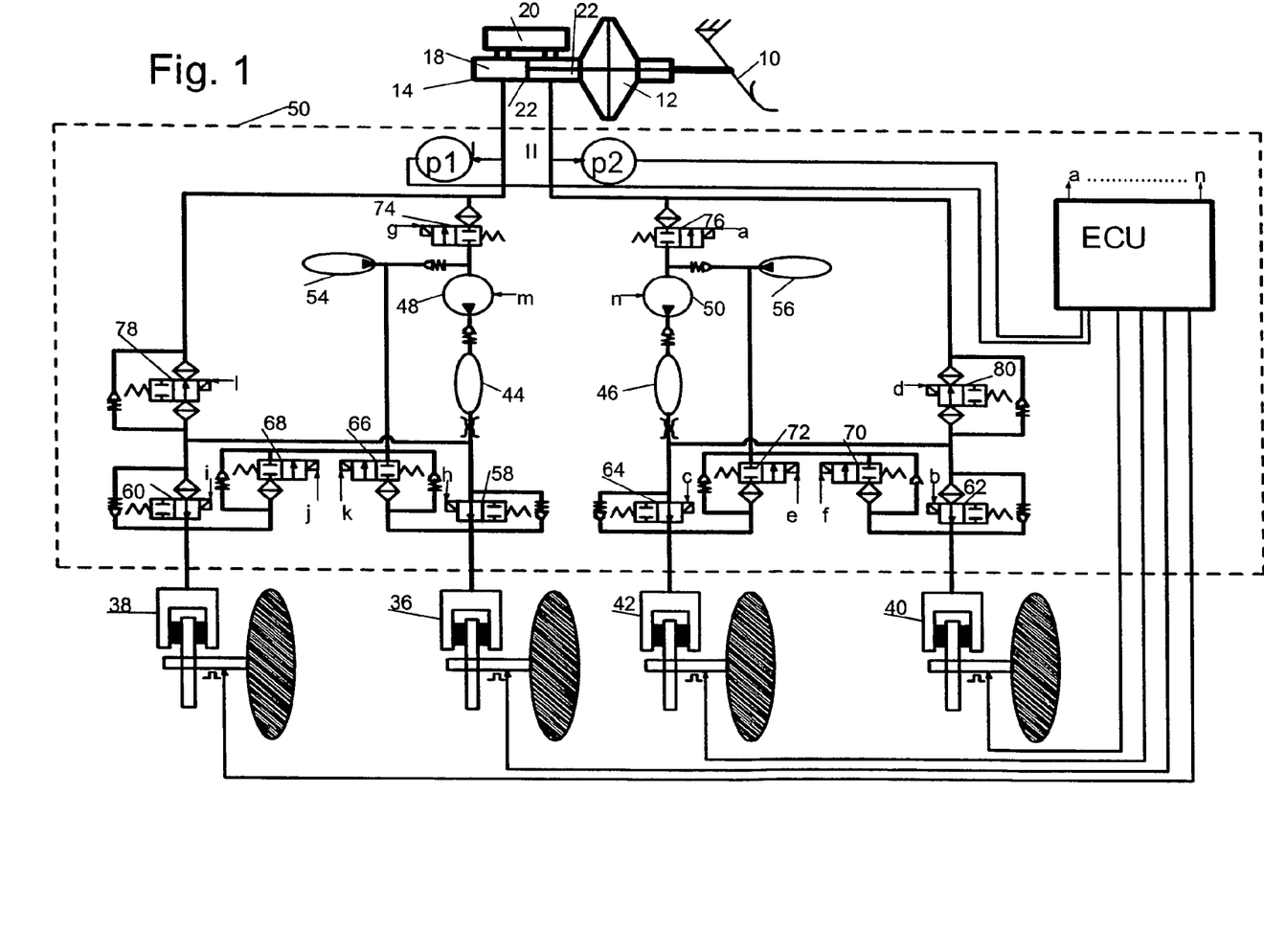
FIG. 1 shows a schematic representation of a braking system with a brake unit according to the invention.

FIG. 1 shows a schematic representation of a hydraulic system with X braking force distribution, with which hydraulic system this invention is to be implemented. A brake pedal 10 to be operated by the driver activates an input element of a pneumatic power brake unit 12, the output element of which acts on a push rod of a main brake cylinder 14. The main brake cylinder 14 has a first 16 and a second cylinder chamber 18, which both communicate with a hydraulic reservoir 20. The two cylinder chambers 16, 18 are separated from each other by a secondary piston 22, and each feed a brake circuit I, II with an electrical/hydraulic unit 50. The two brake circuits I, II, in the case of an X braking force distribution, include on the one hand the brake cylinder 36 of the left rear wheel and the brake cylinder 38 of the right front wheel, and on the other hand the brake cylinder 40 of the left front wheel and the brake cylinder 42 of the right rear wheel. Next to the wheel brake cylinders 36, 38; 40, 42, the associated brake discs are shown. In the electrical/hydraulic unit 50, damper chambers 44, 46, fluid feed pumps 48, 50, reservoir chambers 54, 56, inlet valves 58, 60; 62, 64 and outlet valves 66, 68; 70, 72, and switch-over valves 74, 76 and high pressure on-off valves 78, 80 are provided. The electrical/hydraulic unit 50 is designed so that wheel-specific control based on signals na, nb, nc, nd from wheel rotational speed sensors and pressure sensors p1, p2 can be achieved, e.g. by wheel-specific control of the inlet valves 58, 60; 62, 64 and outlet valves 66, 68; 70, 72; brake-circuit-specific control can be achieved, e.g. by controlling the switch-over valves 74, 76 of the high pressure on-off valves 78, 80 or the return pumps 48, 50. The control signals a . . . n which are required for this purpose are provided by the ECU.

Figure 2:
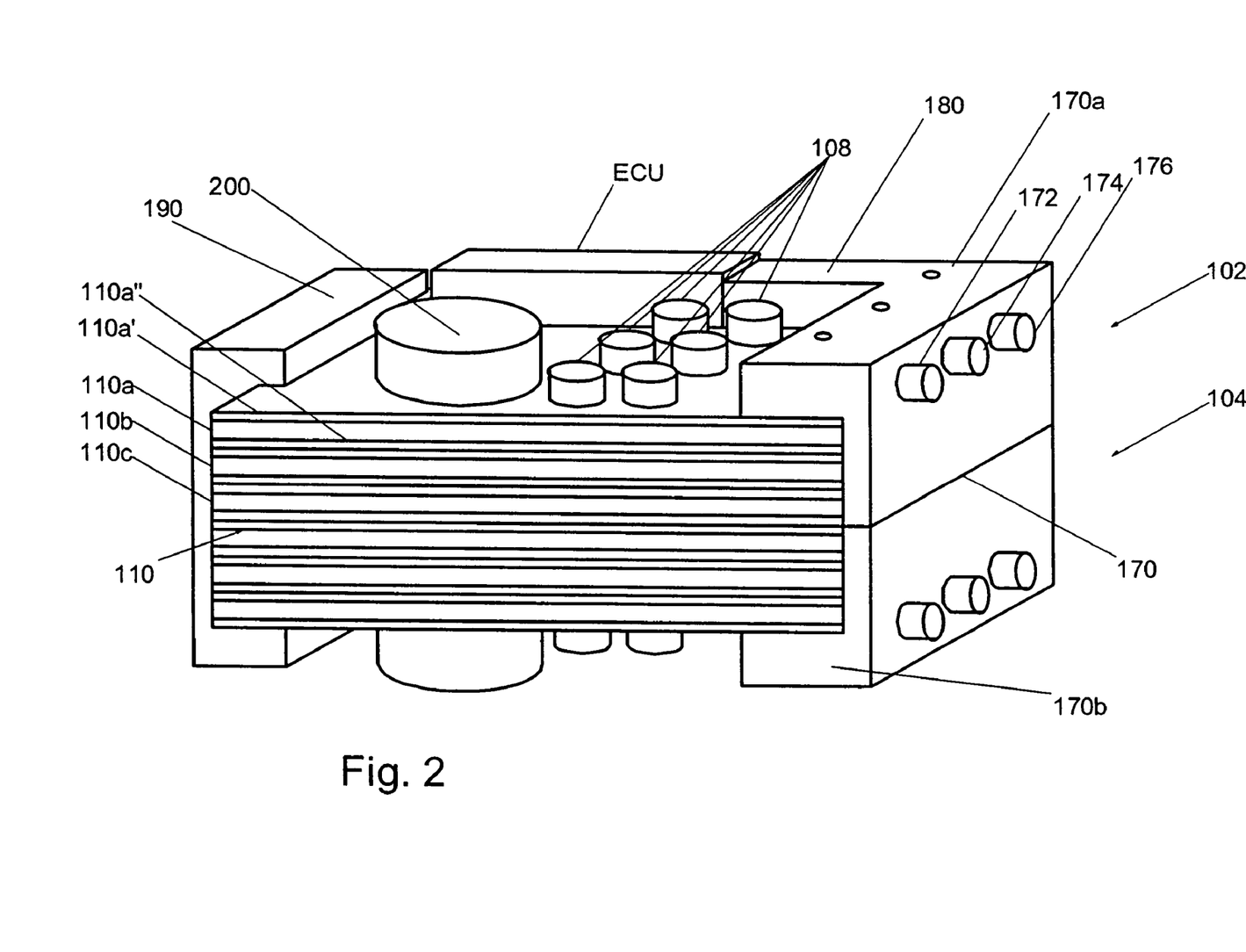
FIG. 2 shows a schematic representation of a brake unit according to the invention, in perspective side view.

A brake unit according to the invention, which is illustrated in its circuit layout in FIG. 1, is illustrated in its structural construction in FIG. 2ff.

The brake unit according to the invention visibly has an essentially cuboidal construction, the components to control the wheel brakes of two wheels in each case, i.e. of one brake circuit I or II, being combined in one module. Two such modules 102, 104—for four wheel brakes—are integrated diametrically opposed "back to back" in a common housing of two half-shells (not further illustrated).

Each of the two modules 102, 104 has the fluid on-off valves 108, which are to be operated electrically, as they are described above as inlet valves 58, 60; 62, 64 and outlet valves 66, 68; 70, 72, and switch-over valves 74, 76 and high pressure on-off valves 78, 80. Each of the modules 102, 104 also has part of the common electronic closed-loop/open-loop control circuit ECU, which supplies the control signals for the fluid on-off valves in the form of electrical solenoid valves, to modulate a hydraulic pressure in the brake circuits. It is understood that the closed-loop/open-loop control tasks can be executed either by one or more common processors for both brake circuits, or by two processor systems which communicate with each other, one for each brake circuit, each of them controlling corresponding driver stages for the electromechanical components (fluid on-off valves, etc.).

The base of each of the modules 102 is formed by a unit body 110 of three or four ceramic boards 110a, 110b, 110c which are connected to each other, as illustrated in FIG. 2. The number of boards of the unit body 110 depends on the complexity of the topologies of the electrical and hydraulic circuits which are to be implemented in the unit body 110. This unit body 110 carries the fluid on-off valves (and the other components), hydraulic connecting lines 112 between the solenoid valves being incorporated in the boards 110a, 10b, 110c. Additionally, the boards 110a, 110b, 110c are used as the carrier board for electrical/electronic components and electrical connecting lines of the electronic open-loop/closed-loop control circuit ECU.

Figure 3:
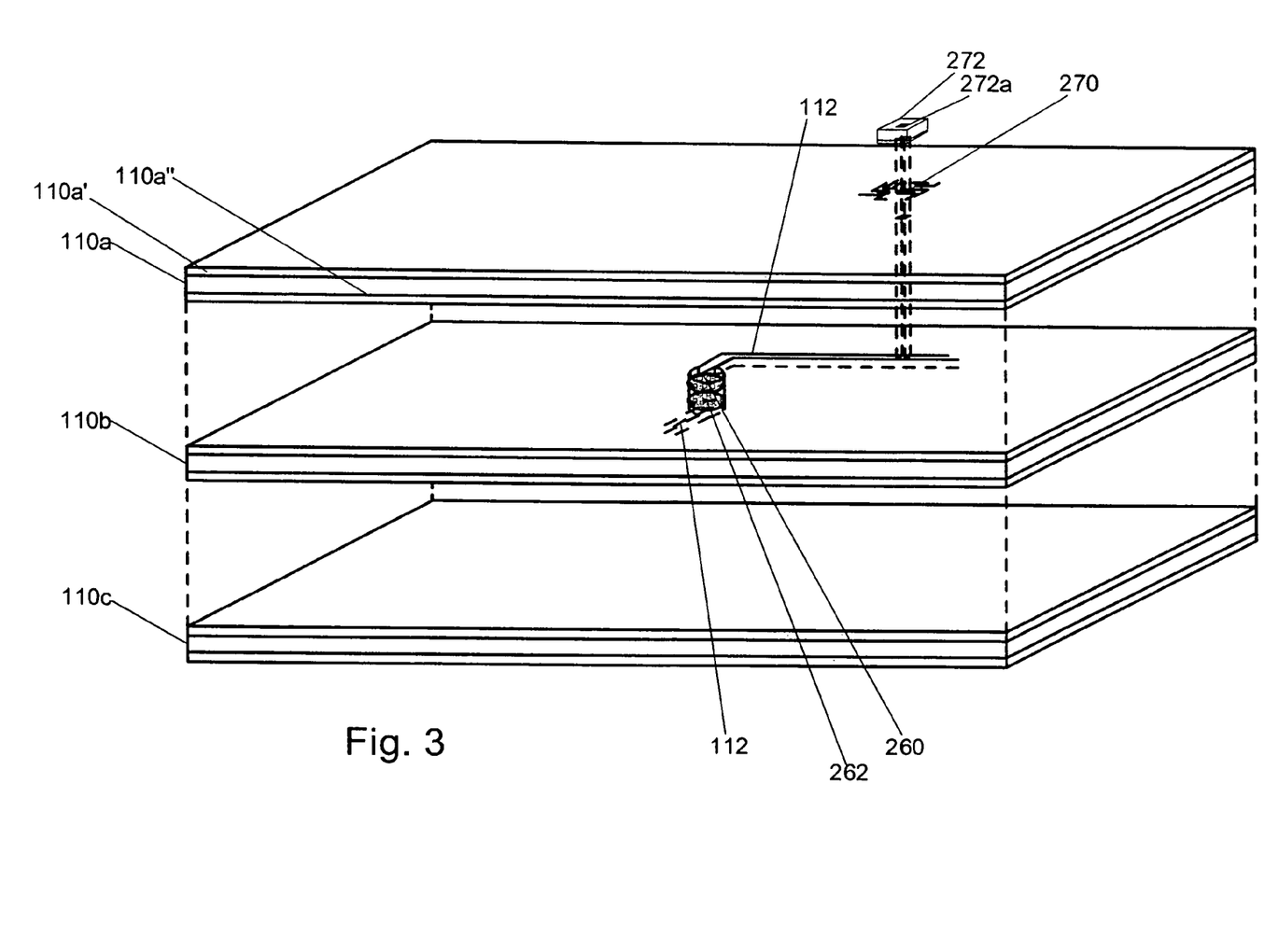
FIG. 3 shows a schematic representation of a unit body according to the invention, in exploded perspective side view.

More precisely—see FIG. 3—the individual boards of the unit body 110 are formed of a silicon nitride ceramic, which in this embodiment has a conductive metal layer containing copper on each of its surfaces, only the metal layers 110a', 110a'' of one ceramic board 110a being indicated, for reasons of clarity. The electrical connecting lines of the electronic closed-loop/open-loop control circuit ECU are formed from one or more of these metal layers, with appropriate plated-through holes if required.

As illustrated schematically in FIG. 3, in the case of the brake unit according to the invention the hydraulic connecting lines 112 in the unit body 110 are formed as recesses or cutouts of the boards/their metal layer.

The boards 110a, 110b, 110c of the unit body 110 are connected to each other by brazing. These connections do not have to take place over the whole surface of the boards. Instead, soldered joints (not otherwise shown) in the form of points, lines or patches are provided, and can be insulated electrically from other regions of the relevant metal layer 110a', 110a''.

Also, in the hydraulic connecting lines, cutouts (vias) 260 which extend through a board of the connecting block 110, and in which porous sinter blocks 262 are inserted and brazed as required as filters for the hydraulic fluid, are provided.

The example shown in FIG. 3 of two sections of connecting lines 112 between a cutout 260, into which a porous sinter filter 262 is inserted, is used only to illustrate the principle of how hydraulic connecting lines are to be implemented out of the ceramic sandwich of connected boards 110a, 110b, 110c with its metal layers. The electrical connecting lines are implemented in the same unit body 110, in a way which is traditional and known in the case of multi-layer boards for electronic circuits.

Figures 4, 4C, 4D:
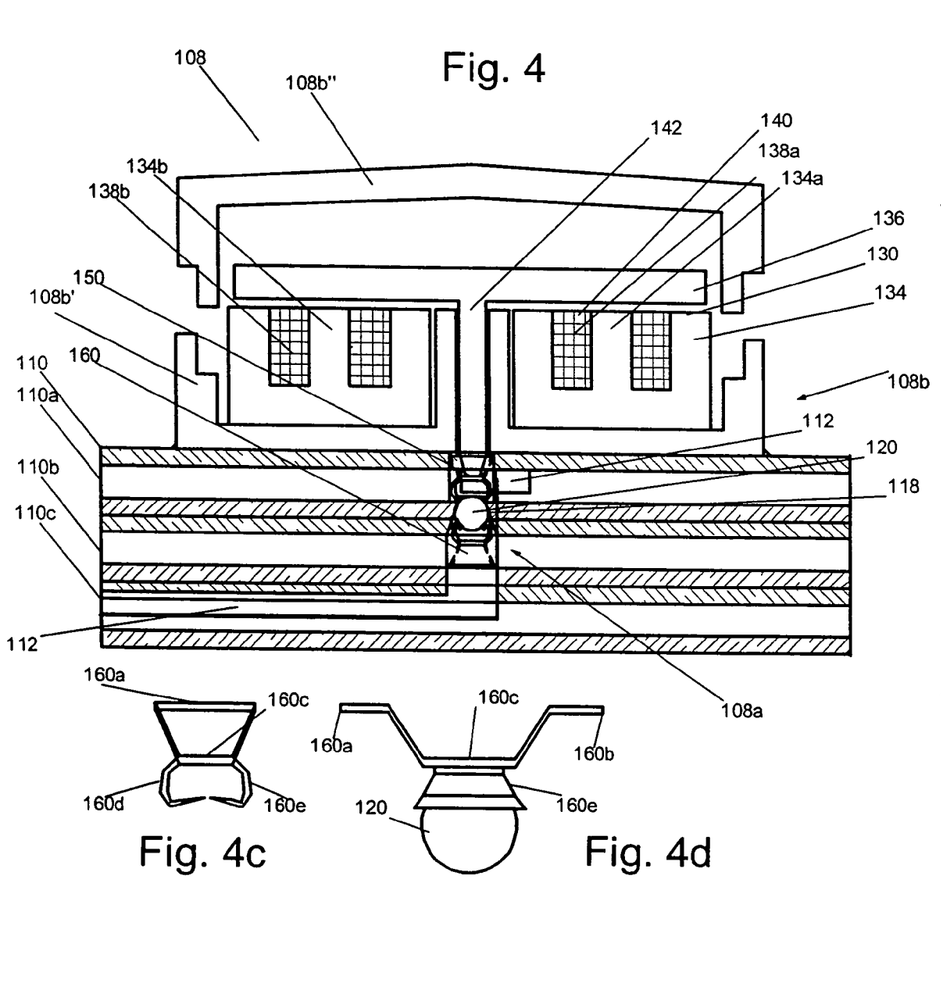
FIG. 4 shows a schematic representation of a fluid on-off valve of a brake unit according to the invention, in lateral sectional representation.
Figure 4A:
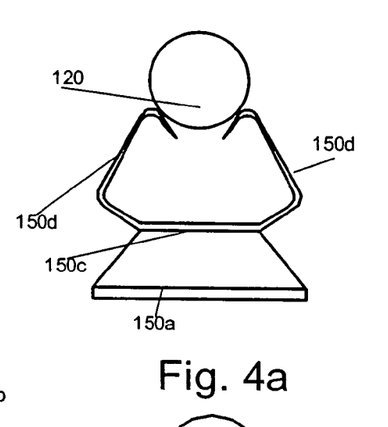
Figure 4B:
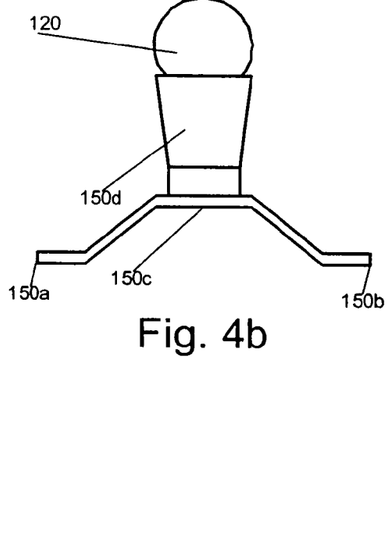

In FIG. 4, one of the fluid on-off valves 108, which essentially are incorporated into the boards vertically to the surface of the boards, which are connected to each other, of the unit body 110, is illustrated. In principle, each of the on-off valves 108 has a hydraulic-mechanical part 108a, which is essentially inside the boards 110a, 110b, 110c of the unit body 110, and with which the flow of hydraulic fluid is blocked or released, and an electromagnetic part 108b, which is essentially outside the boards 110a, 110b, 110c, 110d of the unit body 110, and with which the hydraulic-mechanical part 108a is activated depending on control signals from the electronic closed-loop/open-loop control circuit ECU. The electromagnetic part 108b, which is outside the unit body 110, is received in two shell halves 108b', 108b'' which must be welded to each other, e.g. by means of a laser. One of the two shell halves 108b' is also welded to the surface of the unit body 110 by means of a laser. Alternatively to the two-shell form, a one-part cap (not shown), in which the electromagnetic part 108b, which is outside the unit body 110, of the on-off valve 108 is received, can be provided, the cap being welded to the surface of the unit body 110 by means of a laser.

On one side of the unit body 110, a connecting block 170, which is arranged hydraulically floating on the unit body 110, is provided, with hydraulic connections 172, 174, 176 for the hydraulic connecting lines (see FIG. 2). For this purpose, on one side surface 170a of the connecting block 170, threaded flanges 172a, 174a, 176a, which are flush with blind holes 172b, 174b, 176b, are formed. At right angles to each of the blind holes 172b, 174b, 176b, a fluid channel 172c, 174c, 176c goes out from them, and a sealing bush 172d, 174d, 176d and an O-ring 172e, 174e, 176e are introduced into each of the fluid channels. These sealing bushes extend vertically through the surface of the boards into corresponding connecting lines in the unit body 110. For the two modules 102, 104, the connecting block 170 is divided into two halves 170a, 170b, which lie on both surfaces (top and bottom) of the unit body 110 and extend over the edge at an angle. The halves 170a, 170b of the connecting block 170 are braced against each other and fixed to the unit body 110 by four straining screws, so that even a different coefficient of thermal expansion of the unit body 110 relative to the light metal material of the connecting block 170 does not cause leakages. Additionally, on each connecting block 170 a hydraulic fluid reservoir 170 is formed in the form of a spring-loaded cylinder-piston arrangement.

On the side of the unit body 110 opposite the connecting block 170, an electrical plug-and-socket connector 190 is arranged, to feed sensor signals of external sensors and power supply lines to the electronic closed-loop/open-loop control circuit ECU.

Thus in the common housing of two half-shells, all components of the unit body have space, so that only the electrical plug-and-socket connector 190 and the connecting block 190 with the hydraulic connections 172, 174, 176 extend laterally out of the housing.

Additionally, as illustrated in FIG. 3, in the connecting block 110 the hydraulic connecting lines have openings 270, which are provided with pressure sensors 272. The pressure sensors 272 are unhoused semiconductor chips, which can capture the absolute pressure through an opening 272a in the side away from the relevant connecting line. The semiconductor chips are soldered onto the SiN substrate in a pressure-resistant manner, and are thus in measurement connection to the hydraulic feed line. Since the pressure sensors are thus arranged directly near the hydraulics and the electronic ECU, they can be corrected for temperature effects by the controller. Any zero point drifts can be determined in operation and compensated for. The requirement for precision of the components is thus reduced, and a separate housing for the pressure sensors is also unnecessary. In other words—less expensive uncalibrated sensors, which must be adjusted directly in the controller, can be used. Examples, which are not listed exhaustively, of sensors which can be used in the invention are the LPSi035-HT-A/G, LPSi100-HT-A/G, MPSi001-HT-A/G, MPSi002.5-HT-A/G, MPSi005-HT-A/G, MPSi010-HT-A/G, MPSi030-HT-A/G, MPSi100-HT-A/G of First Sensor Technology GmbH, Carl-Scheele-Strasse 16, D-12489 Berlin, Germany, www.first-sensor.com.

The hydraulic-mechanical part 108a of the fluid on-off valve 108 is formed in multiple cutouts, which are flush with each other, in the boards 110a, 110b, 110c of the unit body 110, and has a valve seat 118, which is an approximately conical opening. Into this valve seat 118, a valve element 120, which is a spherical ceramic body, fits in a fluid-proof manner.

This valve element 180 can be pressed into the valve seat 120 to seal it, and lifted away from it. This is the purpose of the electromagnetic part 108b of the fluid on-off valve 108, which in the shown embodiment is a multipole electromagnet arrangement 130, which brings the valve element 120 into its activated position (open in the shown embodiment).

The multipole electromagnet arrangement 130 has an essentially circular cylindrical stator 134 and a circular disc-shaped armature 136. The stator 134 is in the form of a multipole stator with multiple stator poles 134a, 134b. Exciter coils 138a, 138b are assigned to the appropriate stator poles 134a, 134b. The armature 136 is in the form of a corresponding multipole armature.

Between the stator 134 and the armature 136, the electromagnet arrangement 130 has a working air gap 140, which is essentially oriented transversely to the direction of motion of the armature 136. When current flows through the exciter coils 138a, 138b, the armature 136 is attracted by the stator poles 134a, 134b. A tappet 142, which is formed on the armature 136, is moved in the direction of the valve element 120, so that the tappet 142 causes the valve element 120 to lift from its valve seat 118. The valve element 120 must be activated via a coupling spring element 150 with the armature 136 of the electromagnet arrangement 130. The tappet 142 de-forms the coupling spring element 150, so that it presses the valve element 120 from its valve seat 118. Without current flowing through the electromagnet arrangement 130, the valve element 120 is pressed via a pretensioning spring element 160, which faces away from the tappet 142, into its fluid-proof idle position relative to the valve seat 118. Additionally, the armature 136 in the idle position is held at a distance—the air gap 140—from the stator 134 by the pretensioning spring element 160, via the valve element 120 and tappet 142. In this way an on-off valve which is closed in the idle position is implemented. It is understood that correspondingly an on-off valve which is open in the idle position can also be formed.

Both the pretensioning spring element 160 and the coupling spring element 150 are in the form of approximately rectangular, arched leaf springs (see FIGS. 4a, 4b, 4c, 4d), which are supported on their respective two ends 150a, 150b; 160a, 160b in the unit body 110, and which in their central region 150c, 160c, to the side, have two curved contact shackles 150d, 150e; 160d, 160e, on which the pretensioning spring element 160 and/or the coupling spring element 150 come into contact with the valve element 120.

The pretensioning spring element 160 and coupling spring element 150 are made of a nickel-chromium alloy, the temperature resistance of which ensures that the spring properties of the spring elements are not affected during the process of brazing the boards of the unit body. The spring constant of the coupling spring element is preferably lower than the spring constant of the pretensioning spring element. Such an on-off valve according to the invention has a valve switching time of about 200 µs. The top switching frequency of such valves is about 2 kHz.

As well as the fluid on-off valves 108, the brake unit according to the invention has non-return valves 180, which are incorporated in the boards, which are connected to each other, of the unit body 110. Two of these non-return valves 180 are illustrated as an example in FIG. 5, in association with a hydraulic pump arrangement. With these non-return valves 180, hydraulic fluid can flow through a hydraulic connecting line in one direction and be blocked in an opposite direction. Each non-return valve 180, comparably to the on-off valves 108, has a valve seat 182, which is an approximately conical opening. It also has a spherical valve element 184. The valve element 184 is a ceramic body, which must be pressed into the valve seat 182 by a pretensioning spring element 186 to seal it, and lifted away from the valve seat 182 by flowing hydraulic fluid which presses against the pretensioning spring element 186.

Figure 5:
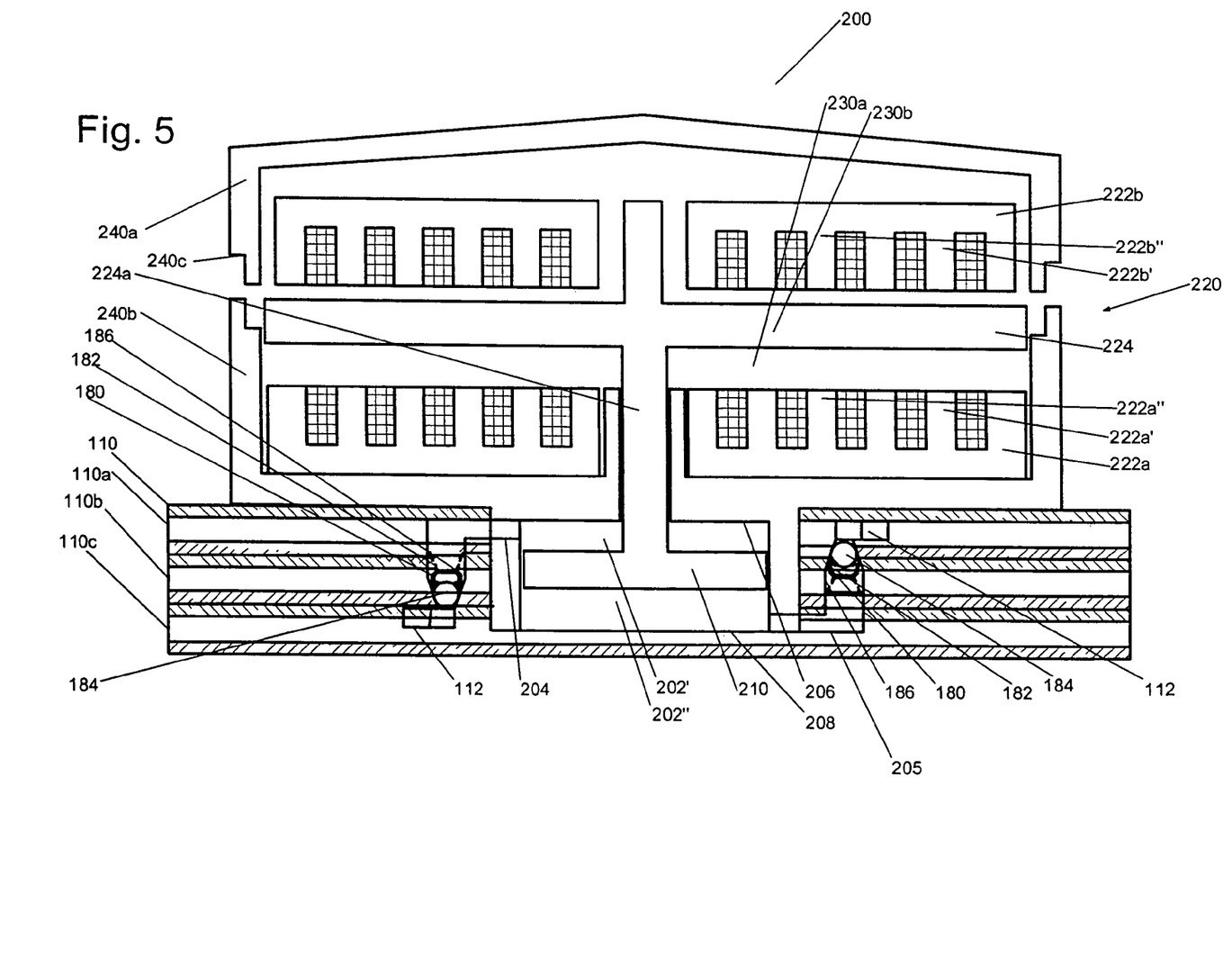
FIG. 5 shows a schematic representation of a fluid pump of a brake unit according to the invention, in lateral sectional representation.

For each brake circuit, the brake unit according to the invention has a hydraulic pump arrangement 200 to put hydraulic fluid under pressure, as illustrated in FIG. 5. Each hydraulic pump arrangement 200 has two pressure chambers 202' and 202", each with two fluid inlets 204 and two fluid outlets 205, leading to a fluid feed line and a fluid removal line respectively. Instead of an equal number of inlets and out-lets, for instance three fluid inlets and one fluid outlet can be arranged along the periphery of the pressure chamber 202. A non-return valve 180 is connected up-stream and downstream respectively from the fluid inlets and outlets, with appropriate orientation of the passing and blocking directions. The pressure chambers 202', 202" have an essentially circular cylindrical shape, with boundary surfaces 206 and 208 at the faces. A ram-shaped piston 210, which can be moved into two end positions by means of a multipole electromagnet arrangement 220, extends through one boundary surface 206. In one end position, a minimum volume is bounded by the pressure chamber 202' and the piston 210, and in the other end position, a maximum volume is bounded by the pressure chamber 202' and the piston 210. Correspondingly, in one end position the pressure chamber 202" has a minimum volume, and in the other end position the pressure chamber 202" has a maximum volume. The multipole electromagnet arrangement 220 has two stators 222a, 222b which are circular cylindrical in outline, and one armature 224. The multipole stators 222a, 222b are each equipped with multiple stator poles 222a', 222b'. Exciter coils 228, which are incorporated in the stator, are assigned to the appropriate stator poles 222a', 222b'. The armature 224 is in the form of a multipole armature, the armature poles of which are aligned onto the appropriate stator poles. Between the two stators 222a, 222b and the armature 224, the electromagnet arrangement in each case has a working air gap 230a, 230b, which is oriented transversely to the direction of motion of the armature. The working air gaps 230a, 230b define the stroke of the armature, and thus also of the piston 210. In one embodiment of the invention, this stroke is about 0.3-0.7 mm, and the internal diameter of the pressure chamber 202 is about 10-25 mm. Thus the hydraulic pump arrangement 200, with an activation frequency of 1000 Hz of the electromagnet arrangement, which acts in both the lifting direction and the pushing direction, can convey a volume flow of about 23 $cm^3$ to 340 $cm^3$ per second. The maximum achievable fluid pressure is about 200 bar. Since every brake unit has two such pump arrangements, a medium hydraulic power of about 1600 W is immediately achievable.

Because of the two multipole stators 222a, 222b, which are arranged at an axial distance from each other, and which between them receive the multiple armature 224, the multipole armature 224 in operation can be attracted by both multipole stators 222a, 222b alternately, to move the piston 210 between its two end positions in the pressure chamber 202. The armature 224 of the multipole electromagnet arrangement 220 is permanently connected to the movable piston.

The pressure chamber 202, the piston 210 and the electromagnet arrangement 220 of the hydraulic pump arrangement 200 are in the form of a preassembled module which can be handled together, and which is to be inserted in a correspondingly shaped recess in the unit body 110. For this purpose, the electromagnet arrangement 220 has a housing which is formed from two half-shells 240a, 240b, and which is welded in a fluid-proof manner on its connection edge 240c, e.g. by laser welding. The armature 224 is welded to a tappet 224a, which is welded to the piston 210. This piston 210 has a surface coating, and runs in the pressure chamber 202, which is coated on its inner wall. The pressure chamber 202, with its cylinder wall and its face facing the electromagnet arrangement 220, is formed on one housing half-shell. This part can thus be preassembled, tested and finally assembled as a module. The induction-side non-return valves are each offset by 90° relative to delivery side non-return valves in the boards of the unit body 110 along the periphery of the pressure chamber 202.

It is understood that the concept according to the invention and the components which are described and illustrated in the figures can be connected and controlled in ways other than what is shown in relation to the configuration from FIG. 1. The above description of the embodiments according to this invention is for illustrative purposes only, and not for the purpose of restricting the invention. Within the invention, various changes and modifications are possible, without leaving the scope of the invention or its equivalents.

The invention claimed is:

1. Brake unit for a hydraulic, single-circuit or multi-circuit braking system of a land vehicle, comprising:
    fluid on-off valves (108) to be operated electrically,
    an electronic control circuit (ECU) to provide control signals for the fluid on-off valves (108) to modulate a hydraulic pressure in brake circuits (I, II),
    a unit body (110), comprised of at least two ceramic boards (110a, 110b, 110c) connected to each other, and which has the fluid on-off valves (108), hydraulic connecting lines (112) between the fluid on-off valves (108) being incorporated in the boards (110a, 110b, 110c) and formed as recesses or cutouts of the boards (110a, 110b, 110c) or their metal layer (110a', 110a"), and at least one of the boards (110a, 110b, 110c) being used as the carrier board for electrical/electronic components and electrical connecting lines of the electronic control circuit (ECU),
    the fluid on-off valves (108) are incorporated in the boards (110a, 110b, 110c), which are connected to each other, of the unit body (11), each fluid on-off valve (108) having
    a valve seat (118), and
    a valve element (120), which is a ceramic body, which must be pressed into the valve seat (118) to seal the fluid on-off valve, and lifted away from the valve seat to open the fluid on-off valve.

2. Brake unit according to claim 1, wherein
    the unit body (110) is formed of said at least two ceramic boards comprising three or more ceramic boards (110, 110a, 110c) which are connected to each other at their surfaces, and of which at least one has, on one of its surfaces, a conductive metal layer (110a', 110a"), from which the electrical connecting lines of the electronic control circuit (ECU) are formed.

3. Brake unit according to claim 2, wherein
    the boards of the unit body (110) are connected to each other by soldering.

4. Brake unit according to claim 1, wherein
    the boards (110a, 110b, 110c), which are connected to each other, of the unit body (110) are formed of silicon nitride, sintered silicon nitride, hot-isostatically pressed silicon nitride or reaction-bound silicon nitride, which is provided on one or both surfaces with a conductive metal layer containing copper or aluminum.

5. Brake unit according to claim 1, wherein
    the valve element (120) is brought into its activated position by means of a multipole electromagnet arrangement (130), and into its idle position relative to the valve seat (118) by means of a spring arrangement.

6. Brake unit according to claim 5, wherein
the multipole electromagnet arrangement (130) has a stator (134) and an armature (136),
the stator (134) is in the form of a multipole stator with multiple stator poles (134a, 134b), and has exciter coils (138a, 138b) which are assigned to the appropriate stator poles, and/or
the armature (136) is in the form of a multipole armature, the armature poles of which are aligned onto the appropriate stator poles (134a, 134b).

7. Brake unit according to claim 6, wherein
between the stator (134) and the armature (136), the electromagnet arrangement has a working air gap (140), which is oriented transversely to the direction of motion of the armature (136).

8. Brake unit according to claim 6, wherein
the valve element (120) is operated via a coupling spring element (150) with the armature (136) of the electromagnet arrangement (130).

9. Brake unit according to claim 8, wherein
the valve element (120) is brought into its idle position relative to the valve seat (118) via said spring arrangement in the form of a pretensioning spring element (160).

10. Brake unit according to preceding claim 9, wherein
the pretensioning spring element (160) and/or the coupling spring element (150) are manufactured from a nickel-chromium alloy, and/or
the spring constant of the coupling spring element is lower than the spring constant of the pretensioning spring element.

11. Brake unit according to claim 1, wherein at least one non-return valve (180) is incorporated in the boards (110a, 110b, 110c), which are connected to each other, of the unit body (110), to allow hydraulic fluid to flow through a hydraulic connecting line (112) in one direction, and to block it in an opposite direction, each non-return valve (180) having
a non-return valve seat (182), which is a approximately conical opening,
a non-return valve element (184), which is a ceramic body, which must be pressed into the non-return valve seat (182) by a pretensioning spring element (160) to seal it, and lifted away from the non-return valve seat (182) by flowing hydraulic fluid which presses against the pretensioning spring element.

12. Brake unit according to claim 1, wherein at least one hydraulic pump arrangement (200) for pressurising hydraulic fluid is provided, having
a pressure chamber (202) with at least one fluid inlet (204) and at least one fluid outlet (205),
a non-return valve (180) in each case on the fluid inlet and fluid outlet,
a piston (210) which extends into the pressure chamber (202), and which can be moved by means of a multipole electromagnet arrangement (220) at least into one of two end positions, a minimum volume being bounded, in one end position, by the pressure chamber (202) and the piston (210), and a maximum volume being bounded, in the other end position, by the pressure chamber (202) and the piston (210).

13. Brake unit according to claim 12, wherein
the multipole electromagnet arrangement is set up to move the piston, which extends into the pressure chamber, into both end positions.

14. Brake unit according to claim 13, the multipole electromagnet arrangement having a stator and an armature,
the stator being in the form of at least one multipole stator with multiple stator poles, and having exciter coils which are assigned to the appropriate stator poles, or
the armature being in the form of a multipole armature, the armature poles of which are aligned onto the appropriate stator poles.

15. Brake unit according to claim 14, wherein
the stator has two multipole stators which are arranged at an axial distance from each other, and which between them receive a multipole armature, which in operation is attracted by both multipole stators alternately, to move the piston between its end positions in the pressure chamber.

16. Brake unit according to claim 14, wherein
the armature is connected to the movable piston or part of it.

17. Brake unit according to claim, 14 wherein
between the stator and the armature, the electromagnet arrangement has a working air gap (230a, 230b), which is oriented transversely to the direction of motion of the armature.

18. Brake unit according to claim 12, wherein
the pressure chamber (202), the piston (210) and the electromagnet arrangement (220) are in the form of a preassembled module which can be handled together, and which is to be inserted in a correspondingly shaped recess in the unit body (110).

19. Brake unit according to claim 12, wherein
said at least one hydraulic pump arrangement comprises two separate pump systems which are to be driven in opposite phase.

20. Brake unit according to claim 14, wherein
between the stator and the armature, the electromagnet arrangement has a working air gap, which is oriented transversely to the direction of motion of the armature.

21. Brake unit according to claim 1, wherein
on at least one side of the unit body (110), a connecting block (170) with hydraulic connections (172, 174, 176) for the hydraulic connecting lines is provided.

22. Brake unit according to claim 21, wherein
the connecting block is arranged hydraulically floating on the unit body.

23. Brake unit according to claim 21, wherein
on a side of the unit body (110) opposite the connecting block, an electrical plug-and-socket connector (190) is arranged.

24. Brake unit according to claim 1, wherein in the hydraulic connecting lines (112), formed as said recesses or cutouts of the boards (110a, 110b, 110c) which extend through at least one board of the unit body (110), and in which filters (262) are inserted.

25. Brake unit according to claim 24, wherein the filters are fixed in the recesses or cutouts of the boards (110a, 110b, 110c) as porous sinter blocks.

26. Brake unit according to claim 1, wherein
in the unit body (110), at least one of the hydraulic connecting lines has an opening (270), through which a force or pressure sensor (272) is hydraulically connected to one of the hydraulic connecting lines, the pressure sensor (272) being unhoused, and soldered onto a board of the unit body (110) in a pressure-resistant manner.

27. Brake unit according to claim 26, wherein
the pressure sensor (272) captures the absolute pressure through the opening (270).

* * * * *